(12) United States Patent
Johnson et al.

(10) Patent No.: US 7,233,319 B2
(45) Date of Patent: Jun. 19, 2007

(54) PERIPHERAL DEVICES FOR PORTABLE COMPUTER

(75) Inventors: Kevin M. Johnson, Natick, MA (US); John D. Gundlach, Acton, MA (US); Jonathan C. Mixter, Weston, MA (US)

(73) Assignee: Newton Peripherals, LLC, West Newton, MA (US)

( * ) Notice: Subject to any disclaimer, the term of this patent is extended or adjusted under 35 U.S.C. 154(b) by 0 days.

(21) Appl. No.: 11/192,336

(22) Filed: Jul. 28, 2005

(65) Prior Publication Data

US 2006/0022943 A1    Feb. 2, 2006

Related U.S. Application Data

(60) Provisional application No. 60/678,451, filed on May 6, 2005, provisional application No. 60/591,948, filed on Jul. 28, 2004.

(51) Int. Cl.
*G09G 5/08*     (2006.01)

(52) U.S. Cl. ...................................................... 345/166

(58) Field of Classification Search ................ 345/157, 345/163–166, 156
See application file for complete search history.

(56) References Cited

U.S. PATENT DOCUMENTS

| | | | | |
|---|---|---|---|---|
| 3,920,322 A | * | 11/1975 | Peters | 353/26 R |
| 5,260,696 A | * | 11/1993 | Maynard, Jr. | 345/163 |
| 5,754,126 A | | 5/1998 | Hilbrink et al. | 341/20 |
| 5,886,686 A | * | 3/1999 | Chen | 345/168 |
| 5,920,306 A | * | 7/1999 | Kikinis | 345/158 |
| 6,116,251 A | | 9/2000 | Stachowski | 132/273 |
| 6,181,322 B1 | * | 1/2001 | Nanavati | 345/156 |
| 6,205,021 B1 | * | 3/2001 | Klein et al. | 361/683 |
| 6,219,037 B1 | * | 4/2001 | Lee | 345/167 |
| 6,266,047 B1 | | 7/2001 | Benja-Athon | 345/163 |
| 6,304,249 B1 | | 10/2001 | Derocher et al. | 345/163 |
| 6,369,798 B1 | * | 4/2002 | Yatsu et al. | 345/167 |
| 6,476,795 B1 | | 11/2002 | Derocher et al. | 345/163 |
| 6,496,180 B1 | * | 12/2002 | Hedman | 345/166 |
| 6,747,633 B2 | | 6/2004 | Jzuhsiang | 345/163 |
| 6,909,421 B2 | * | 6/2005 | Wang | 345/163 |
| 6,940,487 B2 | | 9/2005 | Matsunaga | 345/156 |
| 6,970,156 B1 | | 11/2005 | Silverstein | 345/163 |

(Continued)

FOREIGN PATENT DOCUMENTS

GB    2411452 A    8/2004

(Continued)

OTHER PUBLICATIONS

Derwent Information; English Language translation/summary of JP 11-065754.*

(Continued)

*Primary Examiner*—Amr A. Awad
*Assistant Examiner*—Steven Holton
(74) *Attorney, Agent, or Firm*—Grossman, Tucker, Perreault & Pfleger, PLLC

(57) ABSTRACT

The present invention relates to the storage and recharging of peripheral devices within a computer. In one exemplary embodiment the invention relates to an expandable computer mouse that may be stored and recharged in a port, such as a PCMCIA slot, of a portable computing device.

29 Claims, 11 Drawing Sheets

U.S. PATENT DOCUMENTS

| | | | |
|---|---|---|---|
| 2004/0012568 A1 | 1/2004 | Velikov et al. | 345/163 |
| 2004/0183502 A1 | 9/2004 | Cheng | 320/108 |
| 2004/0196262 A1 | 10/2004 | Poltorak | 345/163 |

FOREIGN PATENT DOCUMENTS

| | | | |
|---|---|---|---|
| JP | 11065754 | * | 9/1999 |

OTHER PUBLICATIONS

Universal PCI to PCMCIA Adapters, retrieved on Jul. 12, 2005. Retrieved online from Elan Digital Systems, using Internet <URL: http://www.elandigitalsystems.com/adapter/index.php>. 2 pages.

PSISM.COM Product Highlights, retrieved on Jul. 12, 2005. Retrieved online from PSI, using Internet <URL:http://www.psism.com/products.htm>. 4 pages.

Verizon Online—FAQs, retrieved on Jul. 12, 2005. Retrieved online from Verizon, using Internet <http://www22.verizon.com/forhomeds/channels/dsl/micro/homenetworking/faq_tech.asp>. 2 pages.

2-in-1 Wireless Presentation Pointer, retrieved on Jul. 6, 2005. Retrieved online from ThinkGeek, using internet <http://www.thinkgeek.com/gadgets/electronic/72ca/images/.

* cited by examiner

PERIPHERAL DEVICES FOR PORTABLE COMPUTER

FIELD OF INVENTION

This application claims the benefit of U.S. Provisional Application No. 60/591,948, filed Jul. 28, 2004 and U.S. Provisional Application No. 60/678,451, filed May 6, 2005.

FIELD OF THE INVENTION

The present invention relates to the storage and recharging of peripheral devices within a computer, and in one exemplary embodiment to a computer mouse that may be stored and recharged in a port of a portable computing device.

BACKGROUND OF THE INVENTION

Portable computers have recently exceeded desktop computers in their popularity. Laptop (notebook) and tablet style computers may be found in the work environment, at home or used during travel, perhaps as a result of their advantages, particularly when equipped with wireless communicating technology. Advantages such as low power consumption, long battery life, small size, low weight and communicability make the portable computer available to nearly everyone everywhere. One potential downside of these devices is their interface with peripheral devices. Often the portable computer must be accompanied by a carrying case which may be used to store a variety of peripheral devices, such as a mouse, power cord, dongles, USB cables, etc.

While text input may still occur through a keyboard, non-text input and selection, via cursor movement such as by pointing and clicking, has continuously evolved. Initially these functions were performed with the keyboard. Then the wired, mechanical mouse was introduced, followed by track balls and joysticks. As the size of personal computers has been reduced and laptops were introduced, "track pads" and "eraser-head" pointing devices were introduced. At first tethered to the laptop by a restrictive cable, wireless technology has allowed the mouse to now be operated freely in the vicinity of the computer.

Originally, the mechanical mouse included a captured moving ball and encoder wherein movement of the ball generated an x, y directional signal to control the cursor. More recently, the optical mouse has been developed which may not be quite as dependent on a planar resting surface. Originally, optical mouse technology bounced a focused beam of light off a highly reflective mouse pad (surface) to a sensor. The mouse pad included a grid of dark lines which interrupted the light beam. The interruption caused a sensor to send a signal to the computer to trigger cursor movement. A current type of optical mouse uses a relatively small camera to take as may as 1,500 pictures per second. A light-emitting diode (LED) bounces light off a work surface into a complimentary metal-oxide semiconductor (CMOS) sensor. The sensor sends each image to a digital signal processor (DSP) which is able to detect changes in pattern in the images. Based on the changes in pattern over a sequence of images, the DSP determines how far the mouse has moved and sends the coordinates to the computer which moves the cursor based on the coordinates received from the mouse. An optical mouse may therefore provide improved tracking resolution, is devoid of moving parts and may be suitable for use on a variety of different surfaces.

Accordingly, within the computer industry, there is a continuing need to improve the general interaction of peripheral devices, such as a mouse, with the host computer. Such improvements may center on expanding the use of a computer port, the identification of special ports or the development of other unique interface protocols. Such improvements may also center on the peripheral device geometry and mechanical functionality and/or optical functionality (e.g., adopting a first configuration when engaging with the computer and a second, more functional and ergonomically pleasing configuration when utilized by the consumer). The peripheral devices may include any electronic device capable of uploading or downloading of information, or even a stand-alone electronic device that may uniquely rely on the computer for storage and/or charging.

SUMMARY OF THE INVENTION

In one exemplary embodiment, the present invention is directed at a wireless device capable of communicating with a computer. The computer includes a location for storing and recharging of the device and the device may assume a first structural configuration to engage at least partially within a location in the computer. The device may then be recharged and/or stored. The peripheral device structure is also capable of assuming a second configuration when removed from the computer. The device may be capable of controlling movement of an on-screen computer reference, for example a cursor or pointer.

In another exemplary embodiment the present invention is directed at a system for storing and charging a peripheral device comprising a computer including a location for storing and charging a peripheral-device and a device which may be stored and charged in a computer wherein said device operates independently of said computer, or is capable of communicating with said computer.

In another exemplary embodiment, the present invention is directed at a device capable of communicating with a computer wherein said device includes imaging optics capable of controlling movement of an on-screen computer reference, wherein the device comprises a structure in a first state where the imaging optics are in a stored configuration. The device is also capable of configuring into a second state wherein the imaging optics are capable of controlling movement of an on-screen computer reference.

BRIEF DESCRIPTION OF THE DRAWINGS

A brief description of the drawings is as follows.

DETAILED DESCRIPTION OF THE INVENTION

Figure 1:
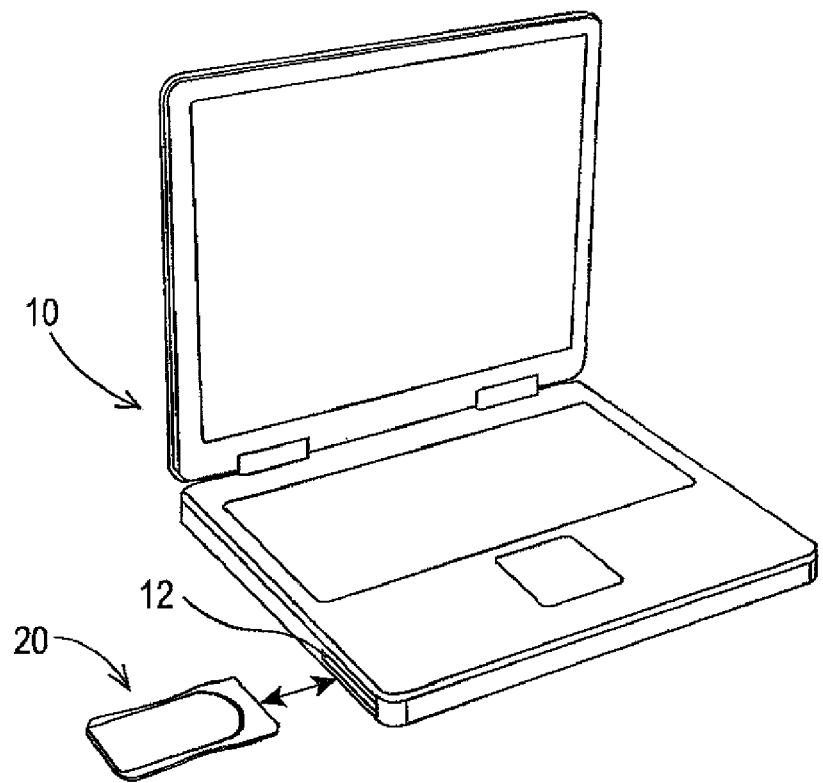
FIG. 1 is a perspective view of a laptop computer which may incorporate the present invention.

The present invention is described more fully hereinafter with reference to the accompanying drawings, in which various exemplary embodiments of the invention are illustrated. This invention, may, however, be embodied in many different forms and should not be construed as limited to the embodiments set forth herein.

For elements common to the various embodiments of the invention, the numerical reference characters between the embodiments are held constant, but distinguished by the addition of an alphanumeric character to the existing numerical reference character. In other words, for example, an element referenced at 10 in the first embodiment is correspondingly references at 10A, 10B, and so forth in subsequent embodiments. Thus, where an embodiment description uses a reference character to refer to an element, the reference character applies equally, as distinguished by alphanumeric character, to the other embodiments where the element is common.

According to one exemplary embodiment of the present invention, peripheral electronic devices may be stored and recharged by inserting them into a port, slot or other mechanical electrical interface in a portable computer. These devices preferably may operate in a wireless technology mode using, for instance, RF, Bluetooth or IEEE 802.11 specification radio frequency technology. The peripheral devices may communicate with integrated wireless technology in the portable computer or may operate using a dongle connected to a USB port. FIG. 1 is a perspective view of a laptop computer 10 including a slot or port 12 into which a peripheral device 20 may be inserted for storage when not in use and for recharging. Any type of electronic device which requires recharging is contemplated, including those which may or may not interface with the computer directly or some types of devices which can operate in either mode. Examples include but are not limited to: a mouse, an MP3 player, a PC card with battery pack, a battery pack, a camera, a cell phone, VoIP phones and laser pointers. It may also include a security device such as a biometric device such as a finger-print scanner, a non-biometric security device, a bar-code scanner, a RFID reader, a flashlight, a disc drive, an electronic wireless network detector, etc. This invention therefore allows consolidation of peripheral devices and recharging without the restriction of cables, cords or chargers.

In one embodiment, the peripheral device 20 may comprise a MP3 player which may fit into the PC slot of a laptop. Upon insertion of the device into the slot, the player connects electrically to the laptop for recharging and may transfer music from the laptop to the MP3 player. The MP3 player may be operated independent from the laptop and may include headphones and controls for navigating the stored song lists and for general operation. The player may have a cross-sectional shape or "form factor" to allow insertion into the slot and corresponding electrical contact locations so that it may be readily recharged.

In another embodiment, the device may comprise a PC card battery such as a lithium polymer battery. The battery may also have a form factor that allows it to fit into a slot or port such as a PCMCIA slot or express card slot in a laptop computer. The device 20 may plug into the slot 12 and be recharged by power from the laptop 10. Upon ejection from the slot, the PC card battery may then be inserted into or connected via a cable to another electronic device, such as a cell phone, a MP3 player or PDA, for instance. The PC card battery may therefore serve as a power source for any device which may be configured to engage with a PC card battery.

Figure 2:
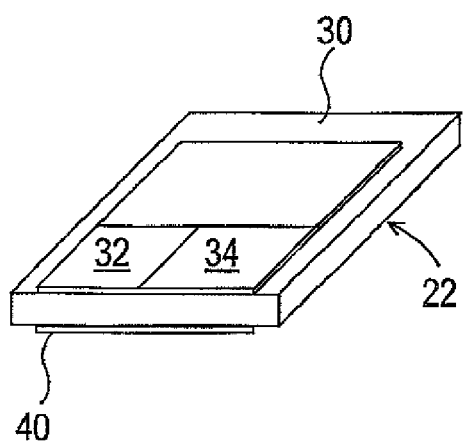
FIG. 2 is a schematic view of one embodiment of a computer mouse according to the present invention.
Figure 2A:
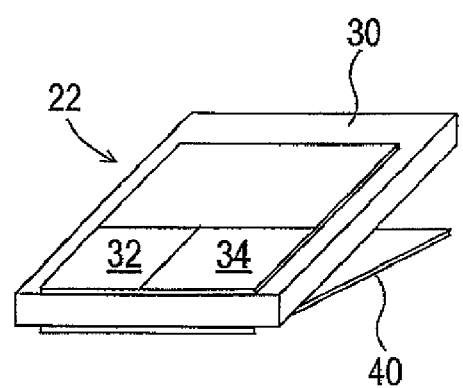
FIG. 2A is a schematic view of the mouse of FIG. 2 in an expanded configuration.

In another embodiment, the device may comprise a pointing device (mouse) for a computer. FIG. 2 is a schematic view of a relatively low profile mouse 22 according to one exemplary embodiment of the present invention. The mouse 22 is shown in a flat or collapsed configuration and is capable of fitting into a slot or port in a portable computer, as indicated schematically in FIG. 1. This then provides convenient storage and recharging. The mouse 22 may include a body portion 30 which may house the optics and electronic as well as functional areas or buttons 32 and 34 for selecting functions in the computer, for instance, left click and right click functions. FIG. 2A is a schematic view of the mouse 22 of the present invention in an expanded configuration for use with the laptop 10. As shown, a base portion 40 has unfolded, hinged around-one end of the mouse and may be held open by a spring or like mechanism (not shown). This expansion or change in shape of the mouse may occur automatically upon ejection from the slot or with the assistance of the user pushing a release button to unfold the base 40. The release button (not shown) may be located anywhere on the mouse, but preferably be located along one side of the mouse.

In one preferred embodiment, the mouse 22 is configured in its collapsed state to fit into a PCMCIA slot along a side or end of a laptop. The mouse, as with the peripheral devices noted above, may have a form factor that coincides to the slot along with electrical contacts to facilitate recharging in the slot.

The expansion of the mouse 22 may therefore be primarily in height or thickness to enable the user to grasp and move the mouse along a surface. Further, since a device that will fit into a slot or port such as a PCMCIA may typically be only about 3-10 mm in height, there is typically little room for the operation of optical and electronic components. Unfolding the mouse 22 may therefore provide extra functional length for the imaging optics and additional space for sources of illumination. This is shown schematically in FIG. 2B in the dotted circle wherein 50 represents an imaging chip including an image plane 52. Reference number 54 represents an illumination source and 56 a prism or light pipe. The lines identified as A and B represent the projection of the image and the light beam, respectively, onto a supporting surface (not shown). Accordingly, unfolding of the mouse may enable the optics to work or allow the optics to better focus on the supporting surface, which would not be as efficient under those circumstances where the mouse was not unfolded. In addition, upon closing of the mouse for storage the optics may be protected from damage.

When the mouse 22 is ready for storage, it may be collapsed back to its original form factor (FIG. 2) and inserted back into a slot 12 in the laptop 10 (FIG. 1). Once inside, the mouse 22 (or other device 20) may be recharged by drawing power from the laptop 10 power supply or alternately, from standard replaceable and rechargeable laptop batteries.

Figure 3:
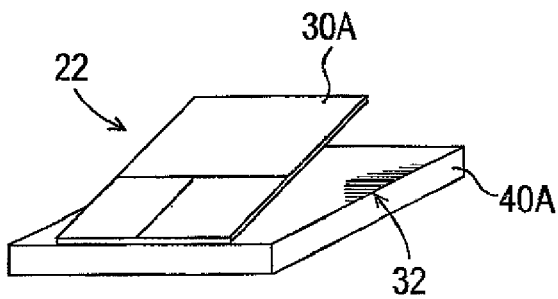
FIG. 3 is a schematic view of an alternative configuration of the flat mouse according to the present invention.

The expansion of the mouse 22 by tilting a portion thereof upward may be from either end. Ergonomically, it may be preferred that the main body 30 of the mouse 22 be wider than, or proud to, the folding base portion 40, making the mouse 22 easier to pick up from a flat surface. Alternatively, as shown in FIG. 3, the base portion 40A may be wider and the body 30A may be raised or pivoted around one end to create the extra height. In this configuration, it may be advantageous to have a depression 32 on one or both sides of the mouse 22 to assist in the unfolding operation by the user.

Figure 2B:
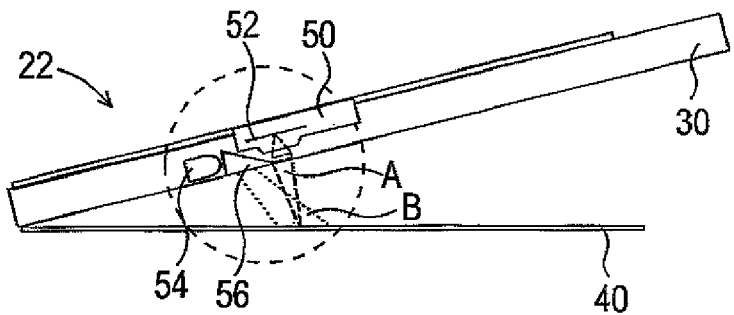
FIG. 2B is a schematic side view of the mouse of FIG. 2.
Figure 4A:
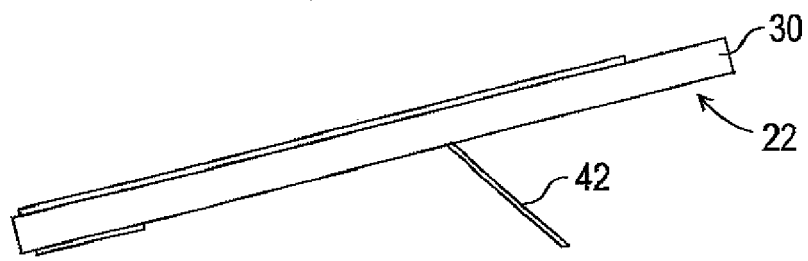
FIGS. 4A and 4B are schematic views of alternative configurations of the mouse of FIG. 2.
Figure 4B:
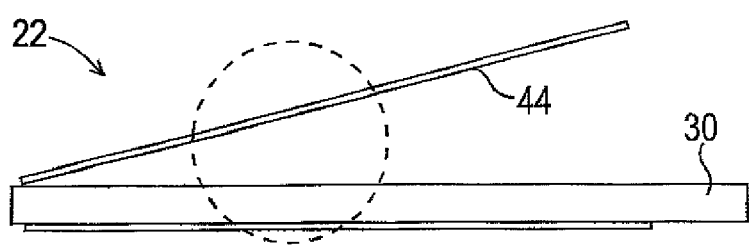

FIGS. 4A and 4B illustrate schematic views of alternate methods for expanding the useable height of the mouse 22. While FIG. 2B illustrates effectively a hinge at one end of the mouse 22, FIG. 4A illustrates a pivoting member 42, preferably spring loaded, that may be attached to the underside of the body 30 and when activated or released pivots outwardly, preferably about 45°, elevating the body 30 off of the supporting surface and rendering the mouse 22 functional (i.e. powering the mouse to an on condition or positioning the optics so that they perform more efficiently, as noted above). The pivoting member 42 or "kickstand" may preferably fold up and may be retained by a detent in the lower surface of the body 30.

Figure 13:
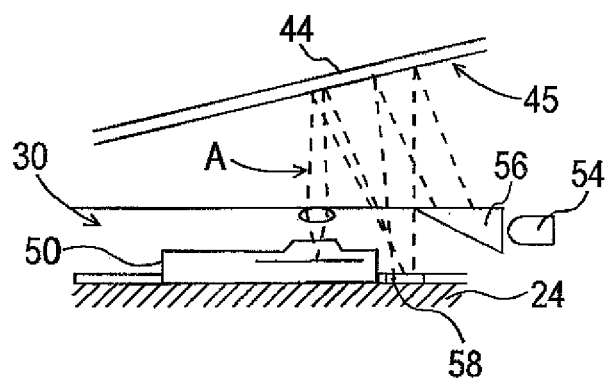
FIG. 13 is a schematic of the optics used in the mouse configuration shown in FIG. 4B, according to the present invention.

FIG. 4B illustrates an alternate configuration for unfolding or expanding the useable height of the mouse 22 wherein a top support flap 44 may be pivoted upward, while the body portion 30 still contains the majority of the electro-optical components on the supporting surface. In this configuration, the optics may be pointed upward to reflect off the underside of the top support flap 44, for instance, as an optical mirror, allowing the optics and illumination to be focused on the support surface beneath the mouse. The body portion may include an opening therein for the reflected light to reach the supporting surface. This is shown in further detail (dotted circle) in FIG. 13 wherein the sensor chip 50 may be placed so that it is pointed upward and the optics A may be reflected off the reflective underside 45 of the flap 44. The base 30 may have an optical hole or opening 58 through which the supporting surface 24 may be imaged.

An alternate mechanism for expanding the operating height of the mouse 22 may include a spring member which may be held in a constrained state (when the mouse is flat) and when released and allowed to bend, causes the mouse 22 to expand in height. In other words, a simple bending of the spring member may allow expansion of the mouse from a supporting surface to improve the ability to grasp the mouse and to provide space for the imaging optics to function. Accordingly, the mouse device herein may include a member that in a first state is constrained and which in an unconstrained state bends and expands the device in height.

Figure 5A:
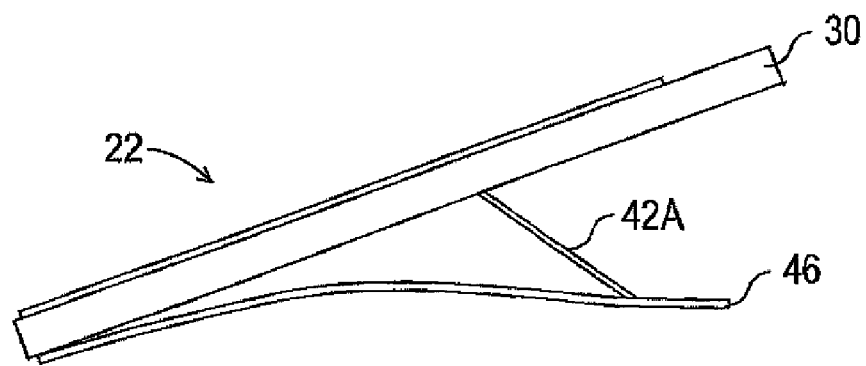
FIGS. 5A through 5E are schematic views of still further alternative configurations of the mouse of FIG. 2.
Figure 5B:

Two exemplary configurations of this feature are shown in FIGS. 5A and 5B. FIG. 5A illustrates a modification of the mouse of FIG. 4A where the pivoting member 42A or "kickstand" is moved into position by releasing a bottom flap 46 from contact with the base 30. The spring member noted above may comprise strips of material which may form the bottom flap 46 and which may comprise, for instance, a carbon spring steel which has been coiled, wound and formed to have an arc. The arc may invert in shape when depressed, or the arc may be constrained in a flat condition for storage and when released may form the arc, raising a portion of the mouse 22 off a supporting surface. Similarly, a U-shaped section of spring steel which has the ends of the "U" compressed together (such as with a hair clip) may provide a mechanism that inverts in curvature to form a "stand" when pressed. In this latter embodiment, the ends of the "U" may be held closely together by over-molding them in a compressed condition with a flexible plastic.

Another configuration of this type is shown in FIG. 5B in which the top flap 44A may bend upward in the center upon removal of the mouse from a slot or port to allow for the mouse 22 to adopt a functioning condition. As with the configuration shown in FIG. 4B, the underside of the top flap 44A, illustrated in FIG. 5B may be reflective to improve the illumination/optic path. The base 30 of the mouse 22 in FIG. 5B may include recesses at either side of the top flap 44A for ease of grasping, or the top flap 44A may be curved on each side to be narrower at the center than at its ends. The bendable flap may be overmolded or coated with plastic to provide a soft-touch effect.

Figure 5C:
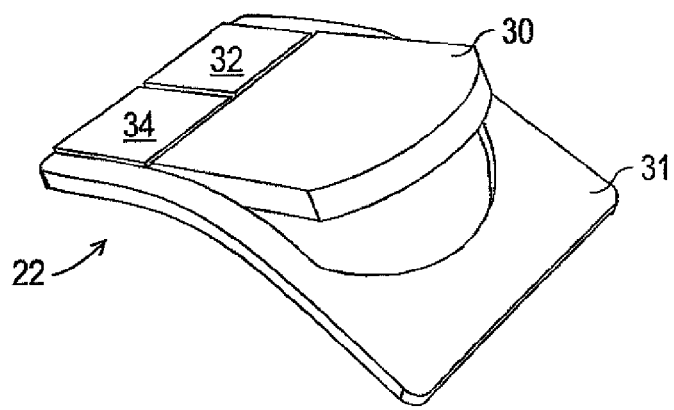
Figure 5D:
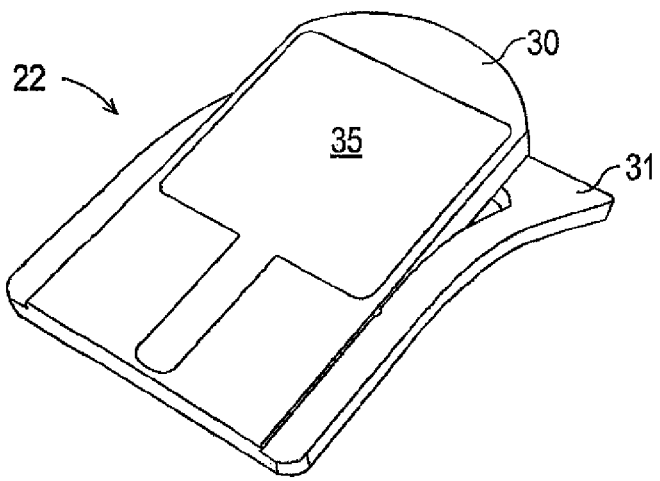
Figure 5E:
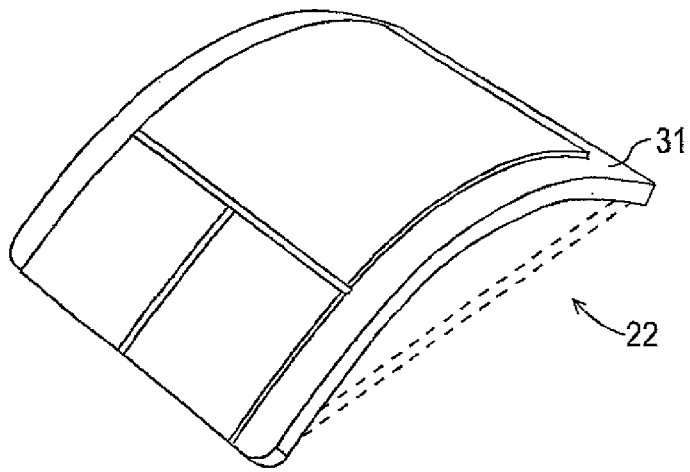

FIGS. 5C through 5E show options where at least a portion 31 of the body 30 of the mouse 22 may bend upon release of a spring member to increase the working height of the mouse off a support surface. The spring member may therefore operate to inwardly bias the ends of the mouse. In a collapsed or flat state, the mouse 22 would resemble that of FIG. 2. The spring member may be of the aforementioned types which may recover or invert when released from a constrained state, such as being held by a detent. In FIG. 5C, only the portion 31 may bend to increase the height of the mouse. In FIG. 5D, the mouse 22 is shown as including an area 35 for touchpad functions, such as dragging and scrolling, as opposed to the finger activated switches 32 and 34 shown on the mouse 22 of FIG. 5C. FIG. 5E illustrates a bendable mouse 22 which may recover from a constrained state wherein the entire body 30 may form an arc above a supporting surface and provide improved ergonomics and space for the imaging optics to function. Here, the structure of the mouse may be molded of a flexible plastic and may include a spring member to assist in forming an arc. In the flexed or expanded state as shown, the shape of the surface of the mouse 22 may approximate the curvature of the top surface of a conventional mouse. In a flattened state, the mouse 22 may have a form factor which allows it to fit within a port or slot in a laptop for storage and for charging. (See FIG. 1).

In a related embodiment, rather than including a spring member in the structure of the mouse 22, bending of the flexible mouse 22 may also be provided by a chord-like member 37, shown in FIG. 5E as a dotted pair of lines. The chord-like member 37 may be attached to one end of the body 30 and when connecting the two ends of the mouse, and pulling them together, will force the body 30 to be formed into an arc.

Figure 6A:
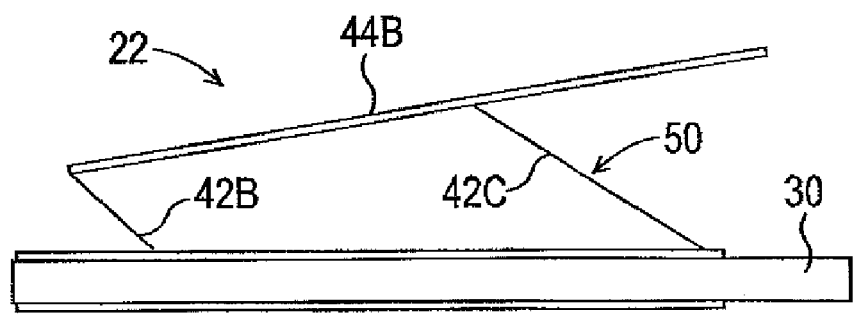
FIGS. 6A and 6B are schematic views of alternative configurations of expansion mechanisms for the flat mouse, according to the present invention.
Figure 6B:
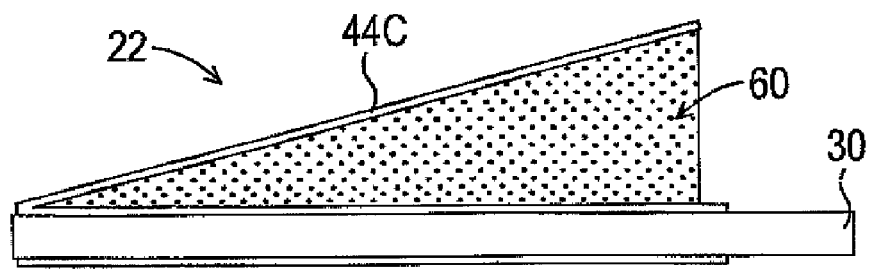

Additional means for expanding the height of the mouse 22 are shown in FIGS. 6A and 6B. In FIG. 6A a multi-bar linkage 50 may be used, such as a 4-bar linkage, the linkage comprising a top flap 44B, the body 30 and pivoting members 42B and 42C. One or more of the pivoting members 42B and 42C may be spring loaded to urge the linkage to unfold. This general premise can also be utilized by raising the optics and electronics from the imaging surface. In FIG. 6B a compressible material 60 such as a flexible foam, comprising urethane, silicone, rubber or the like may be compressed under at least a portion of the top flap 44C to urge the flap to unfold around the hinged end and expand the mouse 22 in height when the flap is released from its stored condition.

Figure 7:
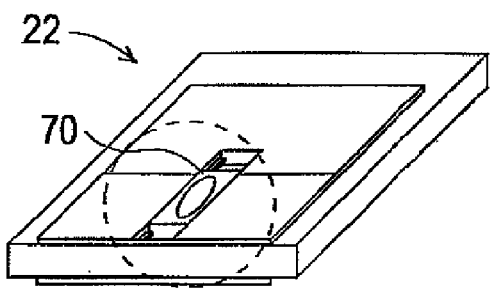
FIGS. 7, 7A and 7B are various views of the mouse of FIG. 6, according to the present invention, showing additional features.
Figure 7A:
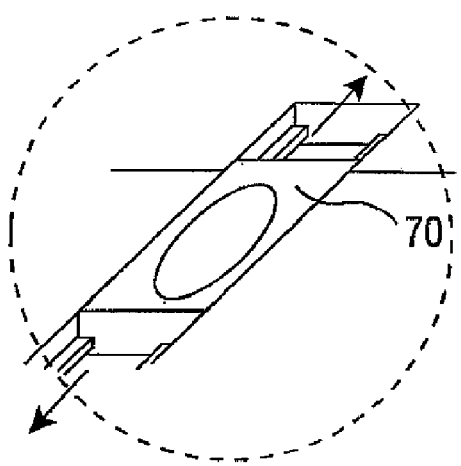

While FIG. 2 illustrates some basic features of the mouse 22 of the present invention, it may be advantageous to provide additional features for the user. To provide "middle button/scroll wheel" type functionality, a virtual scroll wheel may be provided by using a center spring mechanical slider 70, which includes the ability to trigger a button when a downward force is applied. This embodiment is shown in FIG. 7 with an enlarged view of the slider/button mechanism shown in FIG. 7A. Moving the slider 70 fore and aft (note arrows, FIG. 7) longitudinally along the mouse 22 will therefore create the similar functionality with respect to moving a scroll wheel forward and backward. Holding the slider 70 at either extreme position may also provide scrolling (on the computer screen) that may continue until the position of the slider is released. Depressing the slider may also activate a button in the mouse body which may serve the same function as a middle button on a standard mouse. Position detection of the slider 70 may be by linear potentiometer, capacitive sensing, linear optical encoder or an optical interrupt which may measure the increase or decrease in the amplitude of a light signal to detect relative position.

Figure 7B:
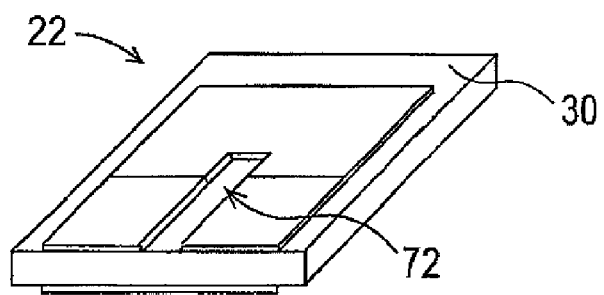

A second option for a "middle button/scroll wheel" type functionality for the mouse 22 of the present invention is shown in FIG. 7B and may comprise a touch pad finger zone 72 which may be capacitive, resistive or other such method that allows position detection. This zone 72 may therefore provide functionality like a scroll wheel. For example, moving one's finger forward or aft in the zone 72 may provide the scrolling function. Tapping the zone 72 to engage a mechanical switch in the body 30 of the mouse 22 may also provide additional functionality. For example, tapping the zone 72 may trigger the condition wherein movement of the mouse 22 may results in a continuous scrolling action on the computer screen.

Figure 8:
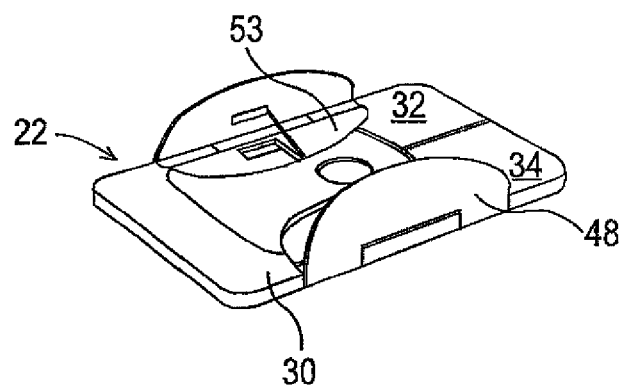
FIG. 8 is a perspective view of the mouse, according to the present invention, illustrating a further alternate configuration.

A still further option is shown in FIG. 8 wherein the low profile mouse 22 may include spring loaded side wings 48 which may unfold from depressions 52 within the body 30 of the mouse 22 for improved ergonomics and functionality. The side wings 48 may lock in place in a vertical or up position and may be spring loaded and released by a separate button or by overcoming a detent (not shown). As shown, the wings unfold upward, however it may also be possible for the wings 48 to unfold from the sides downward beneath the base 30 and elevate the mouse 22. As shown, the wings may not expand the actual height of the mouse and may rely on a compressed optical arrangement such as a bundle of optical fibers which would transmit information from the supporting surface.

Figure 14:
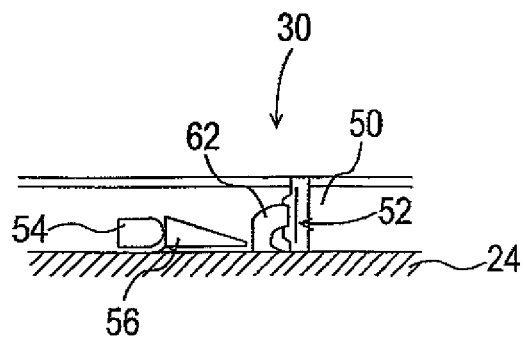
FIG. 14 is a schematic of the optics used in the mouse configuration shown in FIG. 8, according to the present invention.

FIG. 14 illustrates a compressed optical arrangement of the type alluded to above. As with FIG. 2B, an illumination source 54 may project light through a prism or light pipe 56 on to a supporting surface 24 from the base 30. A bundle of optical fibers 62 may receive the information and transmit such from the surface 24 to the image sensor 50 which includes an imaging plane 52. The fibers may relay only diffuse light and not specular reflection, thereby providing reliable image information to the sensor.

Figure 9A:
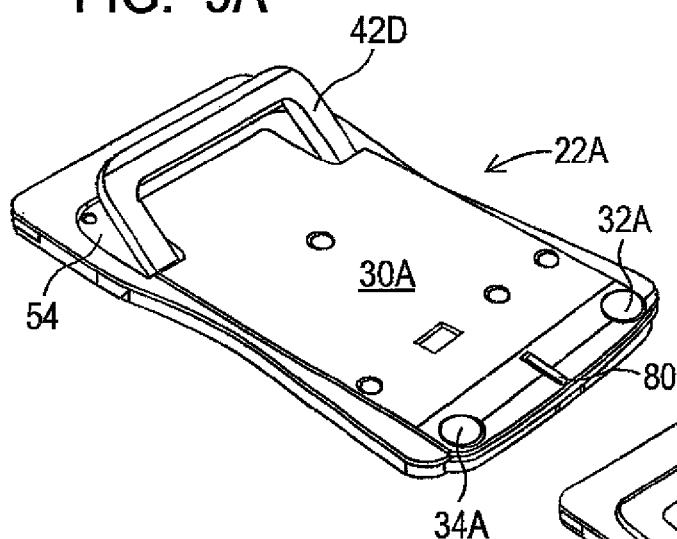
FIGS. 9A, 9B and 9C are perspective views and a side view respectively of a preferred embodiment of the mouse, according to the present invention.
Figure 9B:
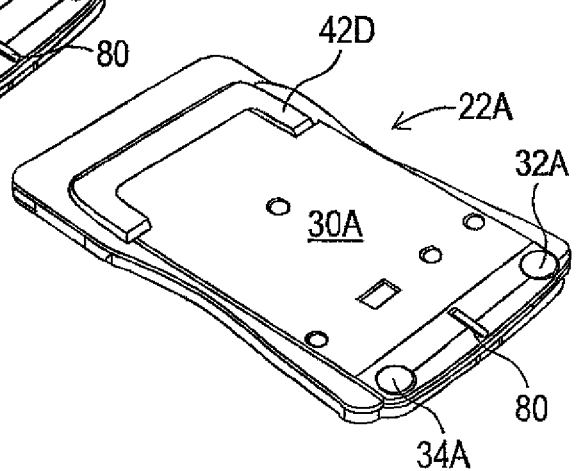
Figure 9C:
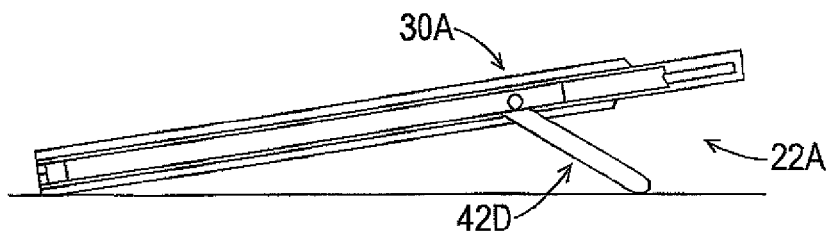

FIGS. 9A, 9B and 9C are perspective views of a preferred embodiment of the mouse of the present invention, illustrating some additional features. The configuration to expand the vertical height of the mouse for functionality is similar to the pivot or kickstand configuration shown in FIG. 4A. As shown in side view in FIG. 9C the mouse 22A includes a body 30A and pivot member 42D which is shown extended. As shown, the rear of the mouse may be pivoted upwards, alternatively the front end or both ends may be elevated (see 4-bar linkage of FIG. 6A) to provide the expansion in height for functionality.

FIG. 9A illustrates a perspective view of the backside of optical mouse 22A illustrating the pivot member 42D extended as well as a recess 54 beneath the member 42D for flush storage of the pivot member 42D when the mouse 22A is being stored and recharged in laptop 10 or a similar device. This collapsed condition is shown in FIG. 9B. The pivot member 42D may be spring loaded to contact a stop feature when the member is rotated outward about 45° from the bottom of the mouse 22A. The spring loading may be sufficient to support the mouse 22A from collapsing during normal operation but light enough to collapse the mouse 22A flat without damage, should a relatively strong downward force be applied to it (such as a book or other similar object falling on the mouse). The mouse may also include a detent in the up position which would increase the force necessary to collapse the mouse for storage.

FIGS. 9A and 9B also illustrate a feature wherein the left click 32A and right click 34A buttons may be disposed on the underside of the mouse 22A. FIG. 2 illustrates the more conventional configuration with the depressible buttons 32, 34 located on the topside of the mouse 22. In the configuration shown in FIGS. 9A and 9B, the buttons 32A and 34A may therefore be located on the underside of the low profile optical mouse 22A and may be actuated by rocking the mouse 22A about a pivot point 80. Then, downward pressure may be applied at either of the front corners of the mouse 22A to activate the click function. In addition, it should be appreciated that the pivot point 80 is such that it would allow the top side of the mouse, which may include a finger activated input to be activated when depressed without activating the buttons on the bottom side of said mouse.

It is also worth noting that the finger activated switches may provide a first functionality when engaged with the computer and a second functionality when removed from the computer, wherein said first and second functionality are the same or different.

Figure 10:
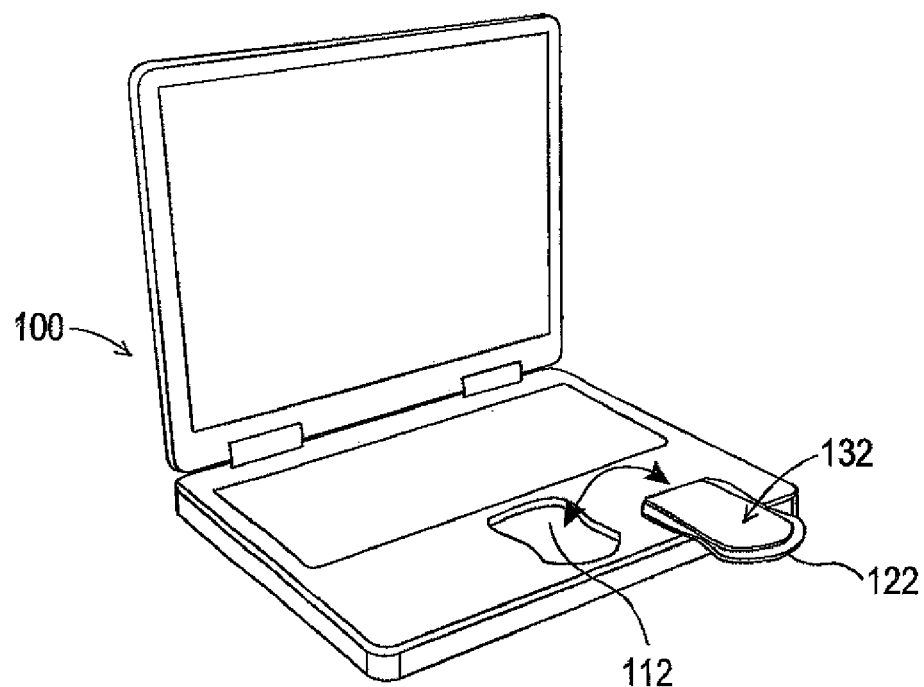
FIG. 10 is a perspective view of a laptop computer illustrating an alternative storage location for a mouse, according to the present invention.

While the mouse or other peripheral devices of the present invention may be stored and recharged in a slot or port in the edge of a laptop or other similar computing device, other locations are possible. For example, in one embodiment, shown in FIG. 10, the mouse 122 may be stored and recharged in the touch pad area 112 of the laptop 100. When in such recharge location, the mouse may be fully functional.

The mouse 122 may then be ejected from the area 112 and function as a wireless mouse adjacent the computer 100. It should be understood that the mouse 122 may include a touch pad on the top surface for the drag and scroll feature, or the mouse 122 may adopt any of the other embodiments disclosed herein, such as finger activated switches and a scroll wheel and the use of imaging optics.

Figure 11:
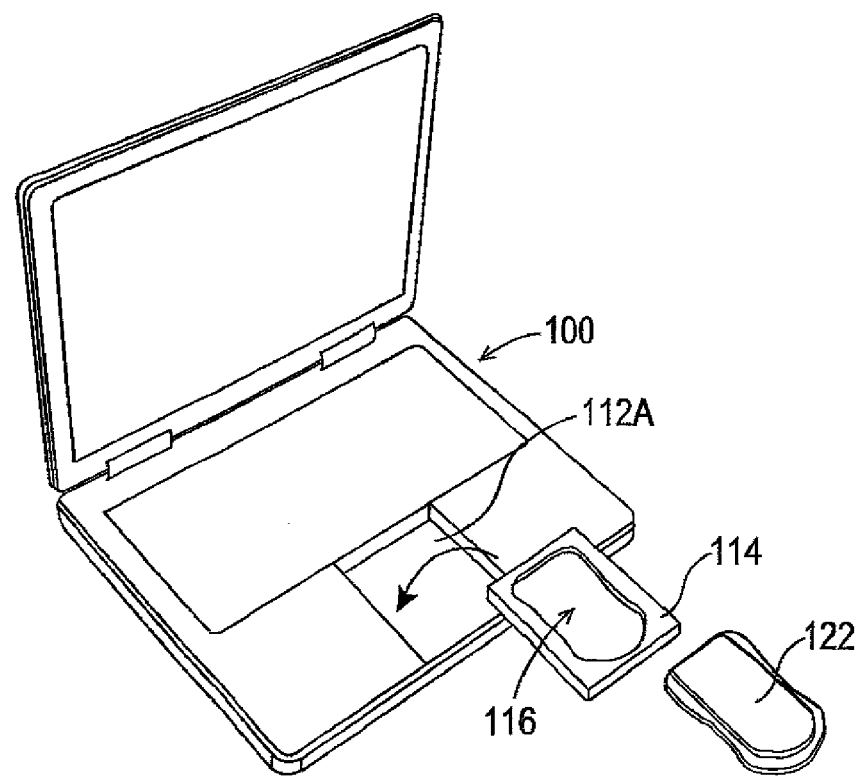
FIG. 11 is a perspective view of a laptop computer illustrating another alternative storage location for a mouse, according to the present invention.

Another configuration for interfacing the mouse with a laptop or similar device for storage and recharging may use a mouse port module 114 (see FIG. 11) which may receive the mouse 122 in a pocket 116 or slot therein. The combination mouse/module may then be plugged into a slot 112A or port to make electrical contact. The module may incorporate a Bluetooth radio or other compatible means for wireless communication with the mouse. While shown in FIG. 11 being insertable in the touch pad area 112A of the laptop 100, the module 114 may also be inserted into a port or slot in the edge of the computer.

Figure 18:
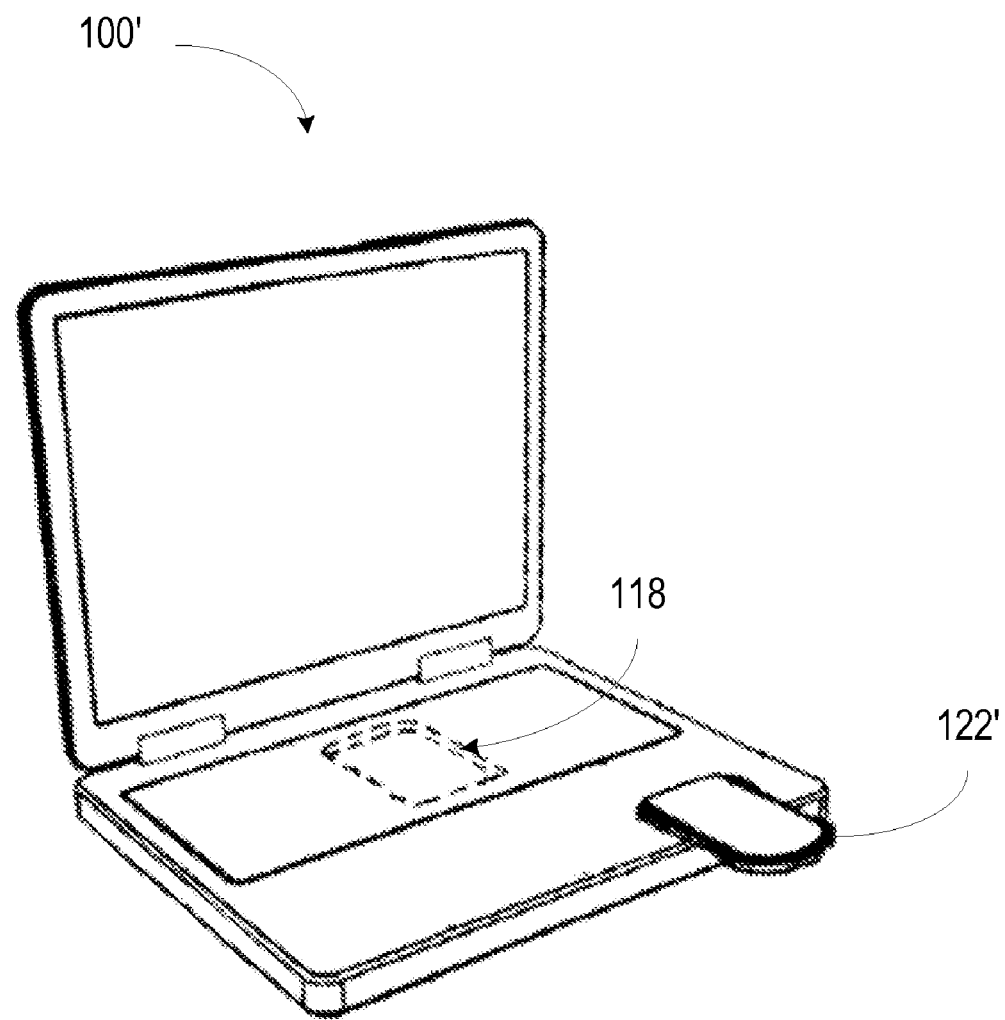
FIG. 18 is a perspective view of a laptop computer illustrating that the flat mouse of the present invention may be stored at a location on the keys of the keyboard of the computer.

It is further envisioned, as illustrated in FIG. 18, that the flat mouse 122' of the present invention, when in a thin or collapsed profile, may be stored at a location 118 (illustrated in phantom) on the keys of the keyboard of the computer 100'. For example, when the laptop is closed, the mouse may be pressed against the keys deflecting them slightly such that the mouse may be depressed into charging contact with electrical contacts placed between the keys and aligned to interface with the mouse to recharge the battery.

Figure 12:
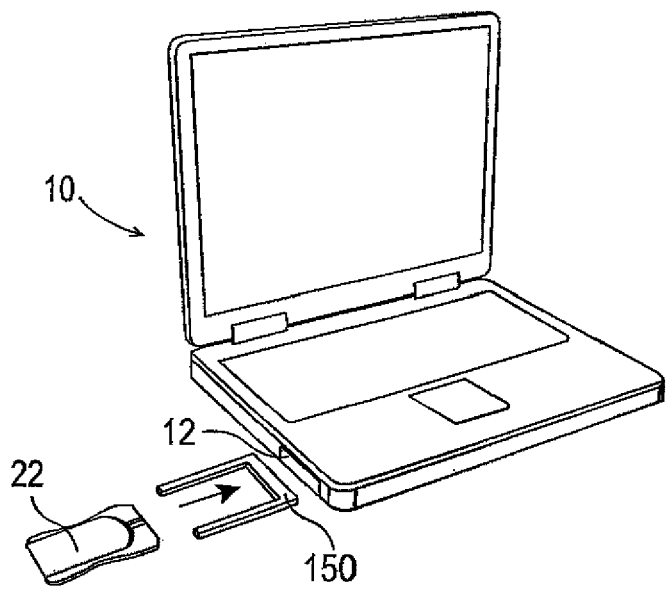
FIGS. 12 and 12A are perspective views of a laptop computer illustrating further alternative configurations for a mouse, according to the present invention.
Figure 12A:
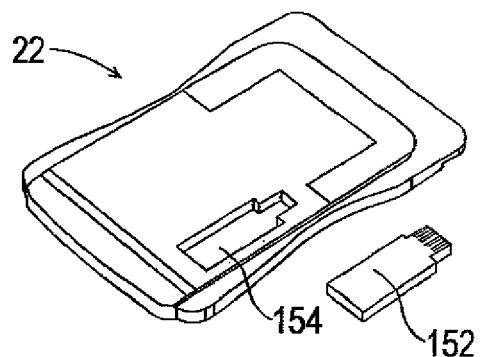

Some laptops or other portable computing devices may not be equipped with a compatible radio such as Bluetooth which is embedded inside the laptop. In order for some of the peripheral devices, such as the flat mouse of the present invention, to work with such a laptop, an external adaptor or "dongle" containing a radio may be required to communicate with the laptop. This adaptor may plug into a USB port or similar slot and may allow wireless communication from the mouse to the laptop. However, typical dongles are fairly large and project out the side, front or back of the laptop such that they may become a hazard. Further, they must be removed when the laptop is folded up and stowed. This then becomes another peripheral device for the user to separately manage and store. As shown in FIG. 12 a dongle 150 may therefore be integrated with the flat mouse 22 of the present invention and may be insertable with the mouse 22 into a slot or port 12 in the laptop 10 when the mouse is recharged. Upon ejection of the mouse from the laptop for use, the dongle 150 may remain with the laptop 10 or may be removed from the mouse 22 and plugged elsewhere into the laptop (for instance, a USB port) for communicating between the mouse and laptop. In a still further embodiment, as shown in FIG. 12A, a USB dongle 152 may be stored in a location 154 partially or entirely in the underside of the mouse 22. When not in use the dongle may reside in the depression 154 while the mouse 22 is being recharged in a laptop 10 (not shown). Upon ejection of the mouse the dongle may be removed and plugged into a USB port in the laptop.

Figure 15:
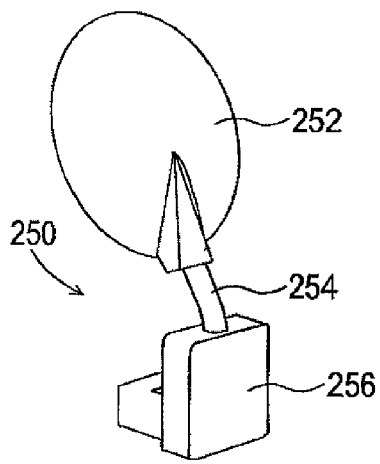
FIG. 15 is a perspective view of a low profile USB connector, according to the present invention.
Figure 16:
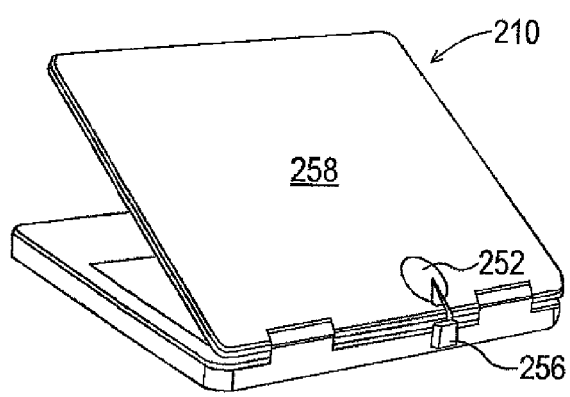
FIG. 16 is a perspective view of the connector of FIG. 15 mounted to a laptop, according to the present invention.
Figure 17:
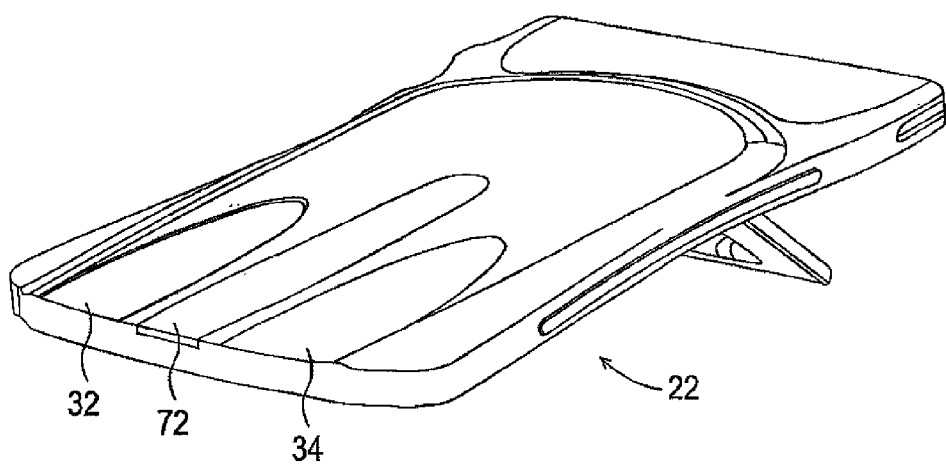
FIG. 17 is another perspective view of the mouse according to the present invention.

In a related embodiment, a low profile dongle may be provided which may not need to be removed when the laptop is stowed, e.g., in a bag or carrying case. As shown in FIG. 15, the low profile dongle 250 may comprise a low profile USB connector 256 and a thin radio housing portion 252 connected by a wire or ribbon cable 254. The connector may be plugged into a USB port in a laptop 210 (see FIG. 16) and the radio housing 252 attached to an adjacent flat surface 258 by adhesive, etc. Accordingly, dongle 250 may be configured such that it does not interfere with the operation of the laptop 210 or the ability of the laptop to be stowed. As illustrated, the flexible cable or wire 254 permits opening and closing of the laptop without interference. The USB connector may be disconnected from its' port if the port is required for some other use or if the laptop is intended for "docking." Accordingly, the present invention relates to a dongle for communicating with a laptop computer, the laptop including a surface and a port, the dongle comprising a computer connector, a radio and a flexible connector therebetween, wherein the radio mounts to the surface and is capable of connecting to the computer connector via the flexible connector, and wherein the computer connector is capable of connecting to said port.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A wireless device capable of communicating with a computer, said computer including a location for storing and recharging said device, said device comprising:
   a structure including a body portion and electro-optical system in a first collapsed state configured to engage at least partially within said location in said computer to be recharged and/or stored;
   the structure in a second elevated state when removed from said computer capable of controlling movement of an on-screen computer reference, wherein said structure houses an electro-optical system comprising a sensing chip, an illumination source and optics;
   wherein upon elevating of said body portion and electro-optical system from a surface said electro-optical system is optimized for the sensing of reflected light and said sensing chip, illumination source and optics maintain their positions relative to each other when said electro-optical system is elevated.

2. The wireless device of claim 1 wherein said computer is a laptop computer.

3. The wireless device of claim 1 wherein said pointing device comprises a computer mouse.

4. The wireless device of claim 1 wherein said structure expands in size when configured in said second state.

5. The wireless device of claim 1 wherein said location comprises a slot or a port in said computer.

6. The wireless device of claim 1, wherein said device further includes a top side and a bottom side and said device expands in height due to pivoting of a spring loaded member from said bottom side to engage a support surface.

7. The wireless device of claim 1, wherein said device includes a member that in a first state is constrained and which in an unconstrained state bends and expands said device in height.

8. The wireless device of claim 1, wherein said device is an optical mouse wherein said optical mouse includes a light-emitting diode (LED).

9. The wireless device of claim 1, wherein said structure in said first state is capable of communicating with said computer.

10. The wireless device of claim 2, wherein said location comprises a touch pad area of said laptop computer.

11. The wireless device of claim 2, wherein said location comprises the keyboard area of said laptop computer.

12. The wireless device of claim 2, wherein said device further includes a dongle which interfaces between said device and said laptop.

13. The wireless device of claim 10, wherein said device includes touch pad functions capable of communicating with said laptop when stored in said touch pad area and when removed therefrom.

14. The wireless device of claim 10, wherein said device comprises a mouse capable of communicating with said laptop when stored in said touch pad area and when removed therefrom.

15. The wireless device of claim 12, wherein said dongle remains in said storage and charging location when said device is removed from said location.

16. The wireless device of claim 12, wherein said dongle is removable from said location with said device and said dongle is insertable in another port in said laptop and said dongle is capable of communicating between said device and said laptop.

17. The wireless device of claim 3, further including a mouse port module for providing an interface between said mouse and said laptop.

18. The wireless device of claim 3, wherein said mouse further includes one or a plurality of finger activated switches capable of generating an input to said computer.

19. The wireless device of claim 3, wherein said mouse includes a top side and bottom side and said mouse includes one or a plurality of buttons for generating an input to said computer, wherein said buttons are located on said bottom side of said mouse.

20. The wireless device of claim 18 wherein said finger activated switches provide a first functionality when engaged with said computer and a second functionality when removed from said computer, wherein said first and second functionality are the same or different.

21. The wireless device of claim 18, wherein said mouse further includes a top side and two finger activated switches are located on said top side including a slider mechanism for generating an input to the computer.

22. The wireless device of claim 18, wherein said mouse further includes a top side wherein said finger activated switches are located on said top side and a touch pad finger zone is located between said switches, said touch pad finger zone capable of generating an input to the computer.

23. The wireless device of claim 19 comprising at least two buttons on said bottom side separated by a pivot location that elevates said mouse from a supporting surface and wherein said top side of said mouse includes a finger activated input which can be activated when depressed without activating said buttons on said bottom side of said mouse.

24. The wireless device of claim 21, wherein said slider mechanism may be depressed to generate an input to the computer.

25. The wireless device of claim 4 wherein said expansion in size comprises an expansion in the height of said device at one or more locations on said device.

26. The wireless device of claim 25, wherein said device includes a component hinged to said device in which said component may be rotated to expand the size of said device.

27. The wireless device of claim 25, wherein said height of said mouse is expanded by a 4-bar linkage.

28. The wireless device of claim 25, wherein said height of said mouse is expanded by the expansion of a compressed plastic.

29. The wireless device of claim 5, wherein said slot is a PCMCIA slot or express card slot.

* * * * *